3,346,408
METHOD FOR PRODUCING FIBERS CONTAINING VISCOSE AND A CASEIN-EPOXY NITRILE COMPOUND

Keinosuke Nakao, Joto-ku, Osaka, and Tsuneo Minamiyama, Hyogo-ku, Kobe, Japan, assignors to Kanegafuchi Spinning Co., Ltd., Tokyo, Japan
No Drawing. Filed Dec. 26, 1963, Ser. No. 333,715
2 Claims. (Cl. 106—140)

This invention relates to a process for producing composite artificial fibers having excellent crimpiness and a woolly "hand" for touch and which are high in elasticity and bending strength or flexure. The fibers are formed by mix-spinning a viscose and a protein derivative having nitrile radical.

It is well known that fibers having a woolly touch or "hand" are obtained by mix-spinning a viscose with a protein. The products are subject to rotting and decomposition and it has been difficult to obtain uniform and satisfactory fibers. Further, the flexure strength of the fibers thus obtained is very low and their tensile strength is also poor. Thus, while they have features similar to those of wool, they are so poor in practicability that they are little used today.

Picara fibers (which are products of Virginia-Carolina Chemical Company, U.S.A.) are obtained by spinning corn protein as a raw material and treating the formed fibers with formalin. The strength of these fibers is about 1.0 to 1.5 g./d. As they have the feel of cashmere, it is recommended to blend them into other fibers to improve the feel of the products.

If a protein can be mixed into viscose without the danger of decomposition and the composite fibers formed can be stably processed, artificial fibers having excellent feel will be obtained and such fibers will be industrially valuable.

This invention is the result of systematic research on the relationship between the molecular structure and colloid property of protein derivatives and the effect of such protein derivatives on composite artificial fibers in order to present the rotting and decomposition of the protein and to uniformly and stably mix said protein derivative.

It has been found that a protein derivative obtained by chemically bonding to a protein in nitrile compound having an epoxy radical as functional radical can be uniformly and stably mixed into viscose and the mixture spun to form a fiber which resists rotting and decomposition.

We have found that fibers which have excellent crimps and the feel of wool which are high in the elasticity and flexure strength can be industrially produced by mixing an aqueous solution of such protein derivative with viscose and subsequently spinning the mixture in any conventional manner.

The protein derivative having nitrile radical as referred to in the present invention is as follows:

A protein derivative obtained by the addition-reaction of a nitrile compound having epoxy radical and a protein.

The details of the protein derivatives to be used in the present invention and their mix-spinning with viscose will be explained below:

Spinning of a mixture of viscose and the derivative produced by the addition-reaction of a nitrile compound having epoxy radical with a protein.

A nitrile compound having epoxy radical will cause an addition-reaction with such active hydrogen as of the amino radical, carboxyl radical or alcoholic hydroxyl radical of a protein in the presence of a basic catalyst to produce a protein derivative having nitric radical as follows:

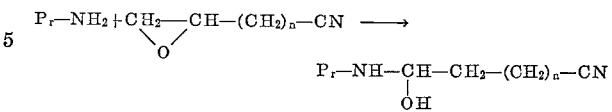

wherein:

$P_r$ designates the polypeptide of protein,
—$NH_2$ designates the terminal amino radical of the protein, and
$n$ is 0, 1 or 2.

For example, 2-cyanomethylethylene oxide will addition-react with a protein to produce a hydroxy-cyanopropylated protein as follows:

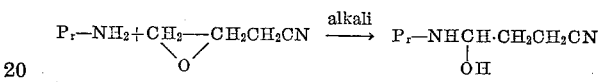

For example, when to a 5%-sodium hydroxide solution of a protein are added 0.3 to 2.0 mols of 2-cyanomethylethylene oxide per mol of the amino acid residue in the protein and a reaction is caused at 40° C. for 1 to 2 hours, an addition-reaction on the alcoholic hydroxyl radical, amino radical and carboxylic radical will smoothly proceed and a hydroxy cyanopropylated protein will be obtained.

As compared with unmodified protein, said protein derivative is higher in resistance to rot and resistance to alkali, and can be mixed uniformly with viscose. The fibers obtained by mixing the mixture in the usual manner have a woolly "hand" and are excellent in the crimps and flexure resistance.

The nitrile compounds that can be used are those which have epoxy radical, e.g. 2-cyanoethylene oxide, 2-cyanomethylethylene oxide, etc. which can cause an addition-reaction with the active hydrogen on a protein.

Since these nitrile compounds have an active epoxy radical, the addition-reaction thereof with protein will quantitatively proceed. As for catalysts, basic catalysts such as sodium hydroxide, potassium hydroxide, primary, secondary and tertiary amines and amine salts may be used. The reaction may be carried out under suitable reaction conditions within a range of a reaction temperature of 10 to 90° C. and a reaction time of 10 minutes to 5 hours.

The proportion of said protein deriavtive to be mixed with a viscose may be 5 to 50%, preferably 10 to 30% by weight based on the fibers to be spun from the mixture.

As mentioned herein above, the protein derivative useful in the present invention is a so-called protein derivative having nitrile radical wherein a nitrile compound having a different kind of functional radicals is introduced by any chemical reaction into the active hydrogen of a polypeptide.

Generally, such protein derivatives are characterized by the following:

(1) Due to the effect of the nitrile radical attached to the protein molecule, the protein derivative will be rotproof and stable. Irrespective of the substituent, the nitrile radical is connected to the polypeptide structure. The higher the content of the nitrile radical, the higher the effect.

(2) The colloidal property of the aqueous solution of said protein derivative is different from that of raw protein. Even if the solution is mixed at any proportion with viscose, the transparency of the solution will not vary and the spinnability is excellent. Therefore, a spinning solution will be able to be prepared without gelling and separation.

(3) In preparing the spinning solution, 10 to 30 parts of said protein derivative are mixed with viscose per 90 to 70 parts the cellulosic component in the viscose. The mixture is extruded through orifices into a conventional coagulating bath (for forming crimped fibers).

(4) The composite fibers thus obtained are high in the flexure strength, have a woolly touch and many crimps and are remarkably high in the elasticity. Especially these crimps are very stable. An example of the features is as follows:

|  | Fibers of this invention | Ordinary staple fibers |
|---|---|---|
| Crimping degree (percent) of the original sample | 28.0 | 21.2 |
| Crimping degree (percent) of the sample as elongated with soda | 12.5 | 9.3 |
| Crimping degree (percent) of the sample as subsequently steam-treated | 21.0 | 14.8 |
| Crimp recovery (percent) | 85 | 69 |

As compared with the ordinary staple fibers, the fibers according to the present invention are much higher in the initial crimping and are also higher in the recoverability of the crimps when the fibers are once elongated with a mechanical force and are then steam-treated.

This is a very important property because, as fibers are usually subjected to numerous mechanical and heating treatments in the spinning, weaving and finishing steps before they are finished to be final products, if the rate of losing the crimps in such treatments in high, the effect of having the crimps will be lost. In this respect, it can be said that the composite fibers according to the present invention keep their inherent high crimpability and have characteristics superior to those of ordinary staple fibers.

Examples of proteins useful in the present invention are cow milk casein, corn protein casein, soybean protein, peanut casein, etc.

*Example*

A mixture of 110 g. (absolute dry weight 100 g.) of casein, 400 g. of water and 23 g. of sodium hydroxide was stirred for 5 to 10 minutes. Then, 28 g. of 2-cyanomethylethylene oxide were added to the solution and an addition reaction was allowed to proceed while stirring at 45° C. for 3 hours. The liquid containing cyanopropylated protein thus produced was cooled to the room temperature and was mixed with 169 g. of 20% aqueous sodium hydroxide solution and 3800 g. of viscose. The mixture was decolored and was spun. The spinning bath comprised 7.5% sulfuric acid, 28.0% sodium sulfate and 1.2% zinc sulfate. The other spinning conditions were as usual in the ordinary spinning process for producing crimped yarns from viscose.

The fibers were then treated with formalin, desulfurized and subjected to usual after-treatments. For the formalin-treatment, the fibers were treated with a solution of 5% formalin and 15% sodium sulfate at 60° C. for 2 hours.

The properties of the fibers obtained were as follows:

| | | |
|---|---|---|
| Denier | | 2.32 |
| Dry strength | g./d | 2.44 |
| Wet strength | g./d | 1.57 |
| Dry elongation | percent | 16.0 |
| Wet elongation | do | 17.7 |
| Crimping degree | do | 14.1 |
| Number of ridges | mm | 16.1/25 |
| Flexure strength | | 536 times |

The fibers had an excellent crimpability and a woolly touch and their flexure strength was high.

What we claim is:

1. A process for producing artificial fibers which comprises (a) mixing viscose with a casein derivative obtained by reacting casein under basic conditions and at a temperature of from about 10 to about 90° C. with an epoxy compound of the formula

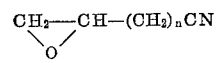

wherein $n$ is 0, 1 or 2, the epoxy compound being 0.3–2.0 mols per mol of the amino acid residue in the casein, the ratio of the casein derivative to cellulose in the viscose being 10:90 to 30:70, and (b) spinning the mixture in a spinning bath.

2. An artificial fiber produced in accordance with claim 1.

References Cited

UNITED STATES PATENTS

| 2,287,028 | 6/1942 | Ambrosio et al. | 106—158 |
| 2,594,293 | 4/1952 | Cowan | 260—119 |
| 3,047,588 | 7/1962 | Van Ess | 260—348 |
| 3,104,154 | 9/1963 | Morimoto et al. | 264—202 |
| 3,202,748 | 9/1965 | Naka et al. | 264—202 |

FOREIGN PATENTS

| 652,943 | 11/1962 | Canada. |

ALEXANDER H. BRODMERKEL, *Primary Examiner.*

DAN J. ARNOLD, *Examiner.*

T. MORRIS, *Assistant Examiner.*